(12) United States Patent
Becker, Jr.

(10) Patent No.: US 6,220,605 B1
(45) Date of Patent: Apr. 24, 2001

(54) SLIP JOINT CONNECTION FOR ENGINE EXHAUST SYSTEM

(75) Inventor: Theodore H. Becker, Jr., Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/115,092

(22) Filed: Jul. 14, 1998

(51) Int. Cl.[7] .................................................. F16L 21/06
(52) U.S. Cl. ......................... 277/591; 277/598; 277/607; 277/609; 277/616; 285/345; 285/374
(58) Field of Search ................................ 272/313, 591, 272/598, 604, 607, 609, 612, 616, 625, 626, 627; 285/345, 374, 347

(56) References Cited

U.S. PATENT DOCUMENTS

| | | | |
|---|---|---|---|
| 2,327,837 | 8/1943 | Williams | 288/26 |
| 2,630,338 | * 3/1953 | Snyder | 285/345 |
| 3,167,324 | 1/1965 | Kratochvil | 277/235 |
| 3,871,786 | * 3/1975 | Rennerfelt | 285/345 |
| 3,985,377 | 10/1976 | Ahola et al. | 285/9 R |
| 4,269,158 | * 5/1981 | Berti | 123/563 |
| 4,313,627 | 2/1982 | de Lange | 285/114 |
| 4,361,331 | 11/1982 | Kohler | 277/1 |
| 4,383,694 | 5/1983 | Fontana | 277/231 |
| 4,452,462 | 6/1984 | Karr, Jr. | 277/105 |
| 4,778,203 | 10/1988 | Bartholomew | 285/111 |
| 5,033,756 | 7/1991 | Sixsmith et al. | 277/188 R |
| 5,050,914 | 9/1991 | Miyashita | 285/336 |
| 5,474,336 | * 12/1995 | Hoff et al. | 285/322 |
| 5,803,512 | * 9/1998 | Hollnagel | 285/319 |
| 5,938,208 | * 8/1999 | Yoshida et al. | 277/592 |

* cited by examiner

Primary Examiner—Anthony Knight
Assistant Examiner—Enoch E. Peavey
(74) Attorney, Agent, or Firm—James B. Golden; Larry G. Cain

(57) ABSTRACT

A slip joint for an engine exhaust system having a male and female manifold section which utilizes a sleeve assembly that is disposed about one of the manifold sections. The sleeve assembly has a positioning portion and locating portion. The positioning portion is in sealing engagement with one of the manifold sections and the locating portion is in resiliently sealing engagement with the other manifold section. The principle use is for exhaust manifold connections, however any joint that has thermal expansion or encounters vibrational loads will benefit from this invention. For example, exhaust gas recirculation systems may have passages connected with this invention.

15 Claims, 2 Drawing Sheets

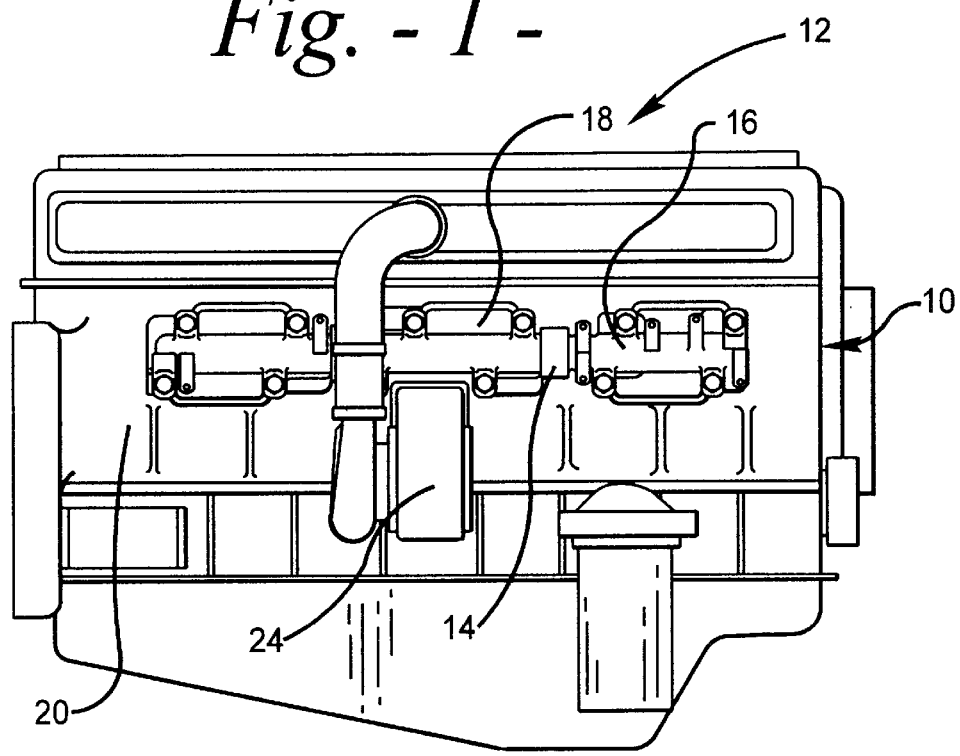
Fig. - 1 -
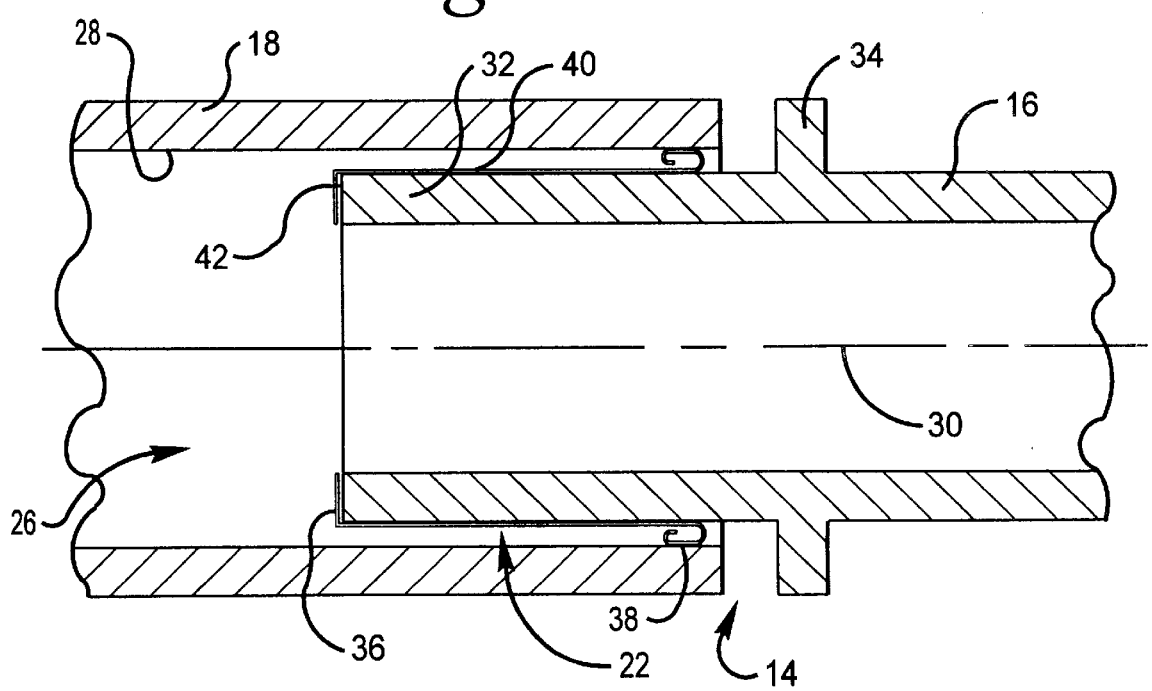
Fig. - 2 -

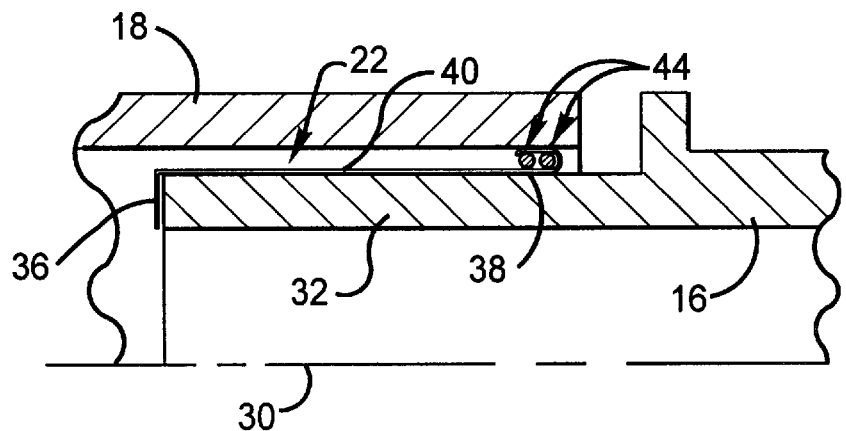
Fig. - 3 -
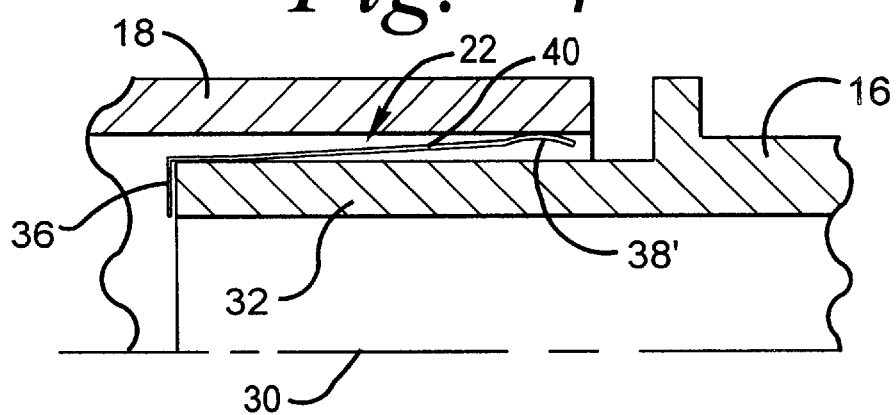
Fig. - 4 -
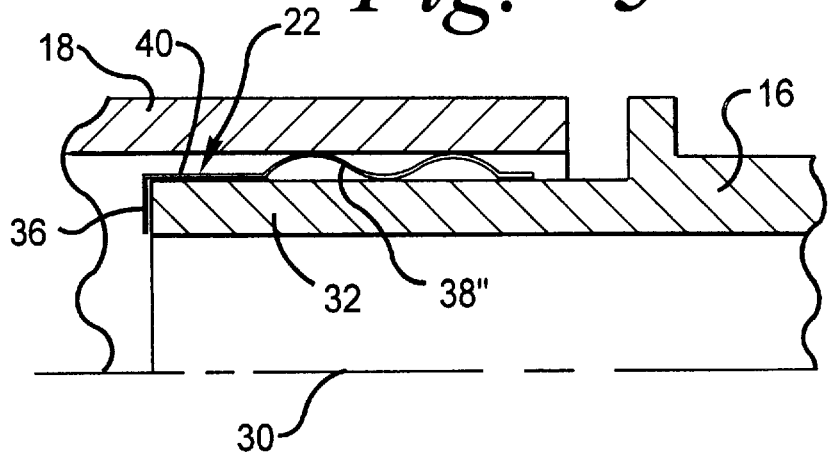
Fig. - 5 -

SLIP JOINT CONNECTION FOR ENGINE EXHAUST SYSTEM

TECHNICAL FIELD

This invention relates generally to an exhaust manifold slip joint, and more particularly to a sleeve assembly having a positioning portion and locating portion that resiliently seal exhaust manifold sections.

BACKGROUND ART

Engine exhaust systems sustain thermal expansion during engine warm up from their engine start size to their engine operation size. The amount of thermal expansion between exhaust system elements is a function of: material properties; engine duty cycle; and ambient temperature. In many cases engine exhaust systems have been designed with a gap between joined elements to compensation for relative thermal expansion of the joined elements. This gap is sized to maintain tolerable stress levels between joined elements for relatively high levels of thermal expansion. Exhaust systems of this design may leak through the gaps when thermal expansion is less than the relatively high level.

Engineers are designing engines to operate over a wider horsepower range for the same application and for more diverse environments than has been previously done. Over the years engineers have discovered that current engines may operate at higher horsepower output levels by increasing combustion pressures. It is this increase in combustion pressure that has lead to higher exhaust temperatures for engines. The environment that engines are required to operate in has also been a factor for engineers to consider. Having a wider range of environments requires exhaust systems to handle different thermal expansion levels. In many cases engine exhaust systems have been improved by having a larger manifold and connecting flange for assembly of manifold sections. The larger the connecting flange, the greater will be the quantity of fasteners required to maintain proper sealing. The different materials used for fasteners compared to the exhaust manifold have lead to different rates of expansion and contraction which causes manifold cracking and fastener fatigue.

Improvements in fuel systems and electronics for engines have added capabilities of operating the engine at different load levels in a relatively short time span. For example, engines operating at high load levels will have a higher exhaust temperature than engines operating at a low load level. The ability to cycle between high and low load conditions will cause thermal expansion due to the fluctuation in exhaust temperatures. In many cases compensation for thermal expansion in exhaust manifolds may be improved by using a seal in combination with the flange. Prior techniques of compensation for thermal expansion is achieved by using seal rings. The seal rings that are known in the art have a tendency to fatigue and leak over time due to the harsh operating environment.

The present invention is directed to overcoming one or more of the problems set forth above.

DISCLOSURE OF THE INVENTION

An exhaust manifold comprises a female manifold section and a male manifold section. The female manifold section has a bore defined by a curvilinear surface and a longitudinal axis. The male manifold section has a neck and a stop. The neck extends into the bore and the stop is spaced from the female manifold section. The male manifold section is in fluid communication with the female manifold section. A sleeve assembly has a positioning portion, a locating portion, and a body portion intermediate said positioning and locating portions. The positioning portion is disposed in sealing engagement with one of the manifold sections. The body portion is generally parallel with the longitudinal axis. The locating portion is in resilient sealing engagement with the other manifold section.

An exhaust manifold for an engine. A female manifold section having a turbocharger mounting flange a bore defined by a curvilinear surface and a longitudinal axis. The turbocharger mounting flange has a generally flat mounting surface for connecting a turbocharger. The turbocharger is in fluid communication with the engine. The female manifold section is fastened to the engine. A male manifold section has a neck and a stop. The neck extends into the bore and the stop is spaced from the female manifold section. The male manifold section is fastened to the engine. The male manifold section is in fluid communication with the female manifold section. A sleeve assembly has a positioning portion, a locating portion, and a body portion intermediate said positioning and locating portions. The positioning portion is disposed in axially abuttable sealing engagement with one of the manifold sections. The body portion is generally parallel with the longitudinal axis. The locating portion is in sealing engagement with the other manifold section.

A method of connecting an exhaust manifold having a female manifold section and a male manifold section with a sleeve assembly. The female manifold section has a bore defined by a curvilinear surface. The sleeve assembly has a positioning portion and a locating portion. The method comprises the steps of assembling the positioning portion in sealing axially abuttable relation with one of the manifold sections. Relatively axially sliding the manifold sections such that the male manifold section enters the bore and the locating portion sealingly engages the other of the manifold sections.

BRIEF DESCRIPTION OF THE DRAWINGS

FIG. 1 is a diagrammatic view of an engine with an exhaust manifold system embodying the present invention;

FIG. 2 is a diagrammatic partial cross sectional view of a slip joint of FIG. 1 embodying the present invention;

FIG. 3 is a diagrammatic partial cross sectional view of a slip joint of FIG. 1 of another embodiment of the Present invention;

FIG. 4 is a diagrammatic partial cross sectional view of a slip joint of FIG. 1 of another embodiment of the present invention; and FIG. 5 is a diagrammatic partial cross sectional view of a slip joint of FIG. 1 of another embodiment of the present invention.

BEST MODE FOR CARRYING OUT THE INVENTION

Referring to FIG. 1, an exhaust manifold 10 is shown attached to an engine 12 which utilizes a slip joint connection 14 between male and female manifold sections 16, 18 which provides for sealing while also allowing movement of the manifold sections 16, 18. It is to be recognized that, slip joint connections 14 are also used with other types of systems, including, but not limited to, exhaust gas recirculation.

The exhaust manifold 10 shown in FIG. 1 is a three piece design fastened to an in-line six cylinder engine 12. The three piece design allows commonality between parts, ease of connection between male and female manifold sections 16, 18, and adaptability of parts with engines operating over various horsepower ranges. The commonality between parts such as the male and female manifold sections 16, 18 allow variations in exhaust manifolds 10 with minimum design modifications. It is also important to adapt exhaust manifolds 10 to different engine ratings. The three piece design allows the exhaust manifold 10 to be placed on engines with at least four cylinders. While the exhaust manifold 10 is attached to a cylinder block 20 by fasteners, such as, bolts and locking tabs, it should also be understood that the exhaust manifold 10 can be attached to the engine 12 using techniques that have been previously disclosed.

Referring to FIG. 2, the slip joint connection 14 embodying the present invention is shown. The slip joint connection 14 uses a sleeve assembly 22 that seals between the male and female manifold sections 16, 18.

The female manifold section 18 is preferably cast from a cast iron alloy, such as ductile iron, is in fluid communication with the engine 12, and routes exhaust flow to an exhaust stack (not shown) or a turbocharger 24. The female manifold section 18 has a bore 26. The bore 26 is defined by a curvilinear surface 28 and a longitudinal axis 30. While a bore 26 with the curvilinear surface 28 is illustrated in FIG. 2 and described herein, it should be understood that the invention is applicable to other type of bores 26, such as oval or square surfaces.

The male manifold section 16 is cast from a cast iron alloy, such as ductile iron and is in fluid communication with the female manifold section 18. The male manifold has a neck 32 and a stop 34. When assembled, the neck 32 extends into the bore 26 of the female manifold section 18 which provides stability between the male and female manifold sections 16, 18. The neck 32 is sized to compensate for manufacturing tolerances to maintain alignment during assembly or servicing. The neck 32 provides structural rigidity to the exhaust system for withstanding vibrational frequencies that the engine 12 imparts on the exhaust system during operation. Vibrational frequencies that effect the exhaust manifold 10 of industrial engines are generally steady vibrational frequencies. Steady vibrational frequencies may be compensated with the use of vibrational dampeners. Vibrational frequencies that effect the exhaust manifold 10 of off highway trucks are generally non-uniform vibrational frequencies which are difficult to compensate for using vibrational dampeners. Applications with generally non-uniform vibrational frequencies may require the neck 32 to extend farther into the bore 26. The stop 34 provides a limit to movement between the female and male manifold sections 16, 18. The stop 34 is spaced apart from the male manifold section 16 during normal engine operation. Having a design that allows movement between the female and male manifold sections 16, 18 will permit the exhaust manifold 10 to non-destructively cycle through thermal expansion and contraction.

The sleeve assembly 22, as shown in FIG. 2, provides sealing of exhaust gases while allowing movement between the male and female manifold sections 16, 18. The sleeve assembly 22 has a positioning portion 36, a locating portion 38, and a body portion 40 intermediate the positioning and locating portions 36, 38. The sleeve assembly 22 as illustrated in FIG. 2, is made of a stainless steel alloy thereby reducing thermal growth differentials and associated stresses that are present during operation of the engine 12 while also inhibiting corrosion of the sleeve assembly 22 from exposure to harsh exhaust environment. However, it should be understood that the invention is also applicable to other types of material, such as ceramics and other exhaust materials that are well known in the art. Having the sleeve assembly 22 made out of a material that has an elastomer characteristic provides the sleeve assembly 22 which maintains sealing between the manifold sections during thermal expansion of the exhaust manifold 10. The positioning portion 36 is disposed about the neck 32 of the male manifold section 16. While having the positioning portion 36 disposed about the male manifold section 16 is illustrated in FIG. 2 and described herein, it should be understood that the invention is also applicable to being disposed about the female manifold section 18. The positioning portion 36 provides an axially abuttable seal 42 with one of the manifold sections and positions the sleeve assembly 22 in the slip joint. The body portion 40 is generally parallel with the longitudinal axis 30 of the bore 26. The body portion 40 allows the sleeve assembly 22 to extend down the length of the neck 32 while providing fluid sealing for one of the manifold sections. Another embodiment as shown in FIG. 3 has the body portion 40 being frusto-conical. This embodiment has the characteristics as described previously and also provides resiliency for the locating portion 38. The locating portion 38 as shown in FIG. 2 provides a resiliently sealing engagement between the sleeve assembly 22 and one of the manifold sections. The resiliency compensates for movement between the manifold sections. The manifold movement is characterized by thermal expansion of the manifold sections or engine vibration that is present during engine operation. Resiliency of the locating portion 38 is accomplished by using a deformable ring 44. While deformable rings of copper are illustrated in FIG. 3, it should be understood that the invention is also applicable to other types of deformable rings, such as elastomeric and ductile metals. Another embodiment of the present invention is illustrated in FIG. 4, which has a locating portion 38' with a shape that provides at least one seal between the sleeve assembly 22 and the associated manifold section. Another embodiment of the present invention is illustrated in FIG. 5, which has a locating portion 38" formed such that multiple seals are provided between the manifold sections. Multiple seals provide added resiliency which may be needed depending on engine size and operating environment. Multiple seals provide redundancy against fluid leakage between the sleeve assembly 22 and the associated, engaged manifold section.

INDUSTRIAL APPLICABILITY

With reference to the FIGS. and in operation, cracking of exhaust manifolds 10 and fatiguing of fasteners and seals caused by thermal expansion are prevented by using the sleeve assembly 22. The sleeve assembly 22 improves sealing between manifold sections for thermal expansion and contraction that are normally present during engine operation than previous techniques. The ability to use the sleeve assembly 22 reduces the quantity of fasteners required and amount of material needed for casting the male and female manifold 16, 18 sections and increases the allowable tolerances between the male and female manifold sections 16, 18.

In operation, the male and female manifold sections 16, 18 are cast from iron material using conventional techniques that are well known in the art. The female manifold section 18 is in fluid communication with the engine 12. The male manifold section has the neck 32 for extension into the bore 26 and the stop 34 for limiting the movement between the male and female manifold sections 16, 18. The male manifold section 16 is in fluid communication with the female manifold section 18.

Following is a method of connecting the exhaust manifold 10 having male manifold section 16 and female manifold section 18 with the sleeve assembly 22 to provide sealing of the exhaust manifold 10 over wide ranges of operating conditions. Assemble the positioning portion 36 in axially abuttable sealing relation with one of the manifold sections. While having the positioning portion 36 disposed about the neck 32 and described herein, it should be understood that the positioning portion 36 maybe disposed about the female manifold section 18. Relatively axially slide the manifold sections such that the male manifold section 16 enters the bore 26 and the locating portion 38 sealingly engages the other of the manifold sections. It should be recognized that the method of assembly is suitable for use in applications requiring slip joints without departing from the spirit of the invention.

Slip joint connections using the sleeve assembly 22 allow proper sealing of manifolds, tubes, and the like while still permitting movement. The sleeve assembly 22 simplifies connecting manifold sections at assembly and servicing intervals by connecting the manifold sections without using tools. The sleeve assembly 22 increases the engineer's ability to design exhaust manifolds 10 that accommodate higher exhaust temperatures and enables engines to operate in more diverse environments than previously done. The positioning portion 36 allows improved and efficient assembly of slip joints over prior techniques by elimination of fasteners without causing fatigue, wear, or cracking of the exhaust manifold 10. The locating portion 38 elastomerically seals the exhaust manifold slip joint connection 14 between the male and female manifold sections 16, 18 which improves sealing due to thermal expansion that is produced from cyclic changes in engine operation or by vibrational frequencies during engine operation.

Other aspects, objects and advantages of this invention can be obtained from a study of the drawings, the disclosure and the appended claims.

What is claimed is:

1. An exhaust manifold joint, being adapted for use with an engine, said exhaust manifold joint having a hot exhaust gas flowing therethrough, said exhaust manifold joint comprising:

a female manifold section having a bore defined by a curvilinear surface and a longitudinal axis;

a male manifold section having a neck and a stop, said neck moveably extending into said bore along said longitudinal axis and being space from said curvilinear surface of said female manifold and said stop being spaced from said female manifold section; and a sleeve assembly having a positioning portion, a locating portion, and a body portion intermediate said positioning and locating portions, said positioning portion being disposed in sealing engagement with one of said manifold sections, said body portion being generally parallel with said longitudinal axis, and said locating portion abutting an end of the other of said manifold section and resiliently sealing engaging the other of said manifold section, and said positioning portion and said body portion being positioned within said space between said curvilinear surface of said female manifold section and said neck of said male manifold section and preventing said hot exhaust gas from escaping from said bore in said female manifold section and said male manifold section.

2. The exhaust manifold, as set forth in claim 1, wherein said body portion being frustoconical.

3. The exhaust manifold, as set forth in claim 1, wherein said sleeve assembly having said locating portion formed to provide sealing engagement with the other said manifold section.

4. The exhaust manifold, as set forth in claim 1, wherein said locating portion having a plurality sealing points between said manifold sections.

5. The exhaust manifold, as set forth in claim 1, wherein said locating portion having deformable ring engaging one of said manifold sections.

6. The exhaust manifold, as set forth in claim 1, wherein said sleeve assembly having a composition of stainless steel.

7. The exhaust manifold, as set forth in claim 1, wherein said sleeve assembly having an elastomer characteristic enabling said sleeve assembly to have the ability to seal said manifold sections.

8. An engine having an exhaust manifold being formed of multipieces and having a plurality of joints therein, said engine comprising:

a female manifold section having a turbocharger mounting flange a bore defined by a curvilinear surface and a longitudinal axis and being adapted to have a hot exhaust gas flowing therethrough, and said turbocharger mounting flange having a generally flat mounting surface for connecting a turbocharger, said turbocharger being attached to said engine, said female manifold section being attached to said engine;

a male manifold section having a neck and a stop, and being adapted to have the hot exhaust gas flowing therethrough, said neck extending into said bore and said stop being spaced from said female manifold section, said male manifold section being attached to said engine, and said male manifold section being in fluid communication with said female manifold section; and a sleeve assembly having a positioning portion, a locating portion, and a body portion intermediate said positioning and locating portions, said positioning portion being disposed in axially abuttable sealing engagement with one of said manifold sections, said body portion being generally parallel with said longitudinal axis, and said locating portion resiliently sealing engaging the other of said manifold section and being adapted to seal the hot exhaust gas.

9. The engine, as set forth in claim 8, wherein said body portion being frustoconical.

10. An exhaust manifold, as set forth in claim 9, wherein said sleeve assembly having said locating portion formed to provide sealing engagement with the other said manifold section.

11. The engine, as set forth in claim 8, wherein said locating portion having a plurality sealing points between said manifold sections.

12. The engine, as set forth in claim 8, wherein said locating portion having deformable ring engaging one of said manifold sections.

13. The engine, as set forth in claim 8, wherein said sleeve assembly having a composition of stainless steel.

14. The engine, as set forth in claim 8, wherein said sleeve assembly having an elastomer characteristic enabling said sleeve assembly to have the ability to seal said manifold sections.

15. A method of connecting a multipiece exhaust manifold having a female manifold section and a male manifold section, said female manifold section and said male manifold section having a space therebetween, a sleeve assembly being positioned substantially within said space, said female manifold section having a bore defined by a curvilinear surface, said sleeve assembly having a positioning portion being in contact with one of said female manifold sections and said male manifold section and a locating portion, the method comprising the steps of:

assembling said positioning portion in sealing axially abuttable relation with one of said manifold sections; and sliding said manifold sections axially such that said male manifold section enters said bore and said locating portion sealingly filling said space and engages the other of said manifold sections verses said one contacting said positioning portion.

* * * * *

UNITED STATES PATENT AND TRADEMARK OFFICE
CERTIFICATE OF CORRECTION

PATENT NO.   : 6,220,605 B1                                            Page 1 of 1
DATED        : April 24, 2001
INVENTOR(S)  : Theodore H. Becker, Jr.

It is certified that error appears in the above-identified patent and that said Letters Patent is hereby corrected as shown below:

<u>Title page,</u>
ABSTRACT, line 9, delete "expansion" and insert "stresses".

<u>Column 6,</u>
Line 52, delete "An exhaust manifold" and insert "The engine".

Signed and Sealed this

Eighteenth Day of December, 2001

*Attest:*

JAMES E. ROGAN
*Attesting Officer*   *Director of the United States Patent and Trademark Office*